United States Patent [19]

Apostolos

[11] Patent Number: 4,646,099
[45] Date of Patent: Feb. 24, 1987

[54] THREE-DIMENSIONAL FOURIER-TRANSFORM DEVICE

[75] Inventor: John T. Apostolos, Merrimack, N.H.

[73] Assignee: Sanders Associates, Inc., Nashua, N.H.

[21] Appl. No.: 536,591

[22] Filed: Sep. 28, 1983

[51] Int. Cl.⁴ .............................................. H01Q 3/22
[52] Int. Cl. ...................................... 342/375; 364/726; 342/196
[58] Field of Search ..................... 343/5 FT, 375, 417; 364/726; 324/77 CS, 77 C, 77 H

[56] References Cited

U.S. PATENT DOCUMENTS 3,255,450 6/1966 Butler .
4,084,148 4/1978 Koshikawa .
4,204,262 5/1980 Fitelson et al. ................... 343/5 FT
4,332,016 5/1982 Berntsen .
4,542,657 9/1985 Barber et al. ..................... 324/77 H Primary Examiner—Theodore M. Blum
Attorney, Agent, or Firm—Richard I. Seligman; Stanton D. Weinstein

[57] ABSTRACT

Signals from antenna elements (14) of a rectangular array (12) are translated in frequency by mixers (16) fed from a chirped local oscillator (19). The resultant signals are fed to the first of two groups (20 and 36) of two-dimensional delay lines connected in series at right angles to each other. The two-dimensional delay lines are dispersive, having a linear relationship of delay to frequency, and the sweep rate of the local oscillator (19) is such that the signals caused by a given frequency component at the mixer input ports are completely compressed in time when they reach the output ports (46) of the delay lines of the second group (36). As a consequence, the device performs a three-dimensional Fourier transformation from time and two spatial dimensions to temporal frequency and two dimensions of spatial frequency. When fed by a two-dimensional antenna array, the output of the device can readily be interpreted as indicating the direction of the source and the frequency at which it is radiating.

3 Claims, 1 Drawing Figure

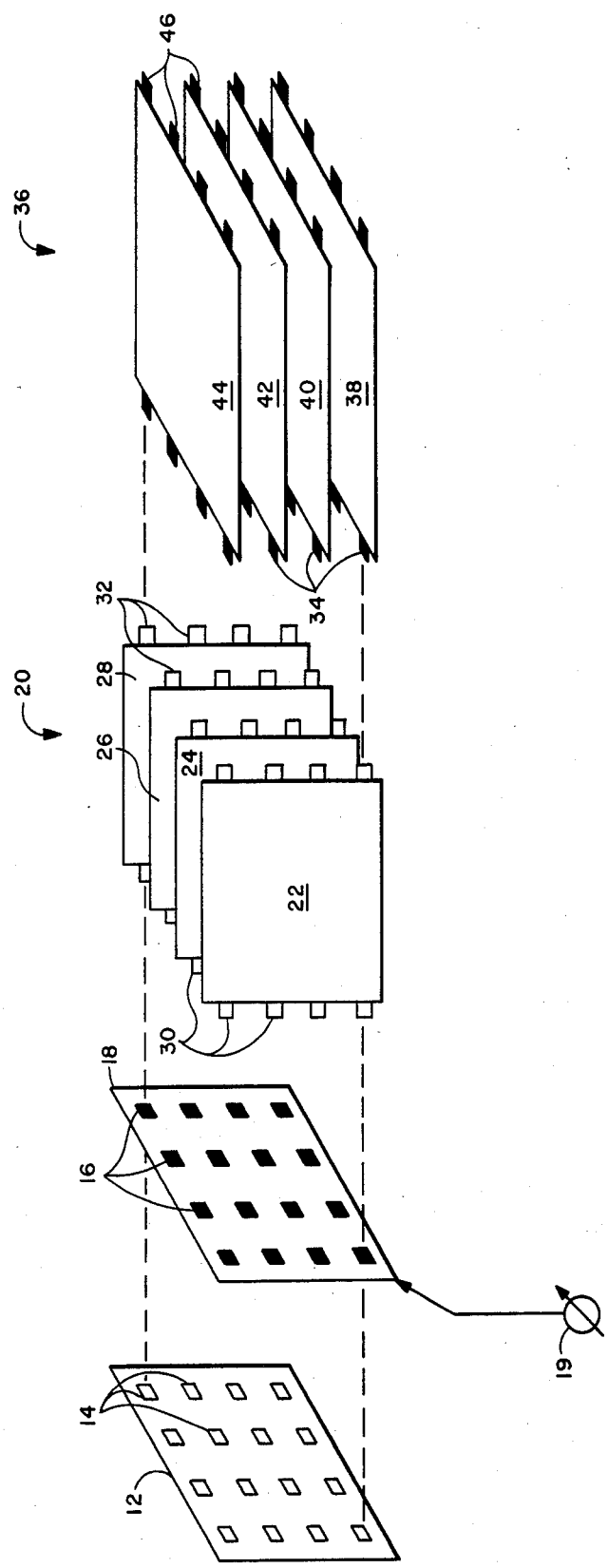

THREE-DIMENSIONAL FOURIER-TRANSFORM DEVICE

BACKGROUND OF THE INVENTION

The present invention is directed to devices for Fourier transformation. Specifically, it relates to the generation of a three-dimensional Fourier transform, the three dimensions being time and two spatial dimensions.

Devices for rapidly locating and identifying the source of an electromagnetic signal often employ Fourier transformation from time to temporal frequency and from position to spatial frequency. The reason for the transformation from time to temporal frequency is obvious: the frequency of the signal is often the single most important factor in identifying the source. Transformation in spatial frequency also turns out to be important. If the signals from a linear array of antenna elements are sampled simultaneously, the resultant group of values has a spatial frequency that is a function of the direction of the source and the temporal frequency of the signal. If the frequency of the source is known—which it is if the Fourier transformation from time to temporal frequency is performed—then the direction of the source can be determined from the ratio of spatial frequency to temporal frequency.

An elegant means for generating a two-dimensional Fourier transform in time and one spatial dimension is the two-dimensional compressive receiver. This device includes a two-dimensional delay line that has input ports arrayed along one end and output ports arrayed along its other end. The delay line is dispersive, having a linear relationship between delay and input-signal frequency. The signals on the antenna elements caused by a source are translated in frequency by frequency translators associated with the elements. The amount of translation sweeps repetitively at a rate that corresponds to the linear frequency-delay relationship of the delay line. The outputs of the frequency translators are applied to the input ports of the two-dimensional delay line. Because of the frequency sweep, later-launched delay-line signals caused by a given frequency component at the frequency-translator input ports travel faster than earlier-launched signals caused by the same frequency component, and the difference in velocity is such that all delay-line signals resulting from a given frequency component in the translator inputs during a given sweep arrive at the output end of the delay line at substantially the same time; i.e., the frequency component is "compressed" in time. Other frequency components are also compressed, but the compressed results of different frequency components arrive at the output end at different times. Hence, the compressive receiver performs a Fourier transformation from the time domain to the temporal-frequency domain.

It also performs a transformation from the position domain to the spatial-frequency domain. The two-dimensional delay line is configured for constructive interference at the output end of the delay line if the signals at the input ports are delayed versions of each other and if their delays bear a linear relationship to position along the input edge. The position on the output end at which the constructive interference occurs depends on the spatial frequency of the group of signals at the input ports. For instance, if all the signals arrive at the same time, there is no advance in phase along the input edge, so the spatial frequency is zero, and the constructive interference occurs near the middle of the output edge. On the other hand, if the input signal has a high temporal frequency and there is a relatively long delay between the various input ports, then there is a large phase advance across the input edge. Therefore, constructive interference occurs toward one or the other side of the output end. There is thus a transformation from position to spatial frequency.

This type of arrangement can be used as a powerful monitoring tool. If the inputs to the frequency translators are signals from elements in a linear antenna array, the time at which an output from the delay line occurs is an indication of the frequency at which the source is radiating. Once the temporal frequency is known, the direction of the source is readily determined from the position of the output port at which the signal occurs. With appropriate modifications, the compressive receiver can also be used with non-linear antenna arrays.

The two-dimensional compressive receiver can thus give information concerning temporal frequency and, say, the azimuth angle of the source. In the alternative, it can be used to determine elevation and temporal frequency. Clearly, however, the same two-dimensional compressive receiver cannot be employed to indicate frequency, azimuth, and elevation simultaneously. Furthermore, although one can use two two-dimensional compressive receivers with orthogonal linear arrays to determine azimuth, elevation, and frequency, ambiguity in position can result if signals from two sources are at the same frequency.

It is thus an object of the present invention to apply the principles of the compressive receiver to three dimensions. It is a further object to provide for unambiguous determination of azimuth, elevation, and frequency simultaneously.

SUMMARY OF THE INVENTION

I have found that the foregoing and related objects can be achieved in a compressive-receiver arrangement having two groups of two-dimensional dispersive delay lines in which the dispersion necessary to achieve complete compression of a given frequency component is provided not by a single delay line but by two delay lines in series.

More specifically, I provide a first group of two-dimensional delay lines whose output ports are arranged in rows and columns. All output ports of the same delay line are in the same column, and output ports in corresponding output positions on different delay lines are in the same row.

I provide a second group of two-dimensional delay lines whose input ports are arranged in rows and columns corresponding to those of the first-group output ports. In the second group, though, the delay line on which an input port is provided determines its row rather than its column, and its position on the delay line determines its column rather than its row. Each output port on a delay line of the first group feeds its signal to the second-group input port lying in the corresponding row and column.

Linearly swept frequency translators translate signals in frequency before they are applied to the input ports of the first-group delay lines. Unlike translators used in two-dimensional delay lines, these translators sweep at a rate that is only high enough to result in complete frequency-component compression after travel through two delay lines in succession. Therefore, individual frequency components are not completely compressed at the output ports of the first-delay lines. Nonetheless, I have found that constructive interference still occurs in the first group of delay lines in accordance with spatial frequency in one dimension.

The signal maxima resulting from the constructive interference in the first-group delay lines all occur in the same row and thus are all fed to the same delay line of the second group. The signal maxima launch signals in that second-group delay line that constructively interfere at the output end of the delay line at a point determined by spatial frequency in the other dimension. This occurs even though the signals at the input ports of the second-group delay lines differ from those received by the delay line of a typical two-dimensional compressive reciever. Also, time compression of the frequency components is completed at the second-group output ports. The outputs of the second group of delay lines thus represent a Fourier transform in time and two spatial dimensions.

BRIEF DESCRIPTION OF THE DRAWING

The sole drawing figure is a diagram of an embodiment of the present invention used with a billboard antenna array.

DETAILED DESCRIPTION OF THE PREFERRED EMBODIMENT

The drawing depicts a three-dimensional surveillance system employing a square two-dimensional array 12 of antenna elements 14. The antenna elements are arranged in orthogonal rows and columns. Typically, the signal components received by antenna elements from a given source are delayed versions of each other, the relative delays depending on the direction of the source. The circuitry to the right of the array 12 processes the signals from the various antenna elements 14 to give an indication of the frequencies of the incoming signals and the directions from which they arrive. It will be seen that this is accomplished by performing a three-dimensional Fourier transformation of the signal ensemble from the array 12.

The signal from each antenna element 14 is applied to an associated frequency translator 16. For ease of understanding, the frequency translators 16 are depicted as being arranged on a board 18 in a geometrical matrix corresponding to the arrangement of the antenna elements 14.

The frequency translators typically include mixers fed by a local oscillator 19 that is repetitively swept in frequency, or "chirped." The frequency translators 16 may also include filters for eliminating undesired harmonics generated during the mixing process. The frequencies resulting from the frequency translations are the differences between those of the antenna signal and that of the chirped local oscillator. The frequency-translation circuits 16 may also typically include position- and frequency-weighting networks for preventing sidelobes in the compressive-receiver outputs.

In the illustrated embodiment, the antenna array has a rectangular geometry. With appropriate accommodations, the circuit of the present invention can be employed with other antenna geometries. In such situations, further circuitry would be required to transform the antenna signals to signals from an equivalent linear array.

The difference-frequency signals are fed to a first group 20 of two-dimensional dispersive delay lines 22, 24, 26, and 28. These delay lines are of the type used in two-dimensional compressive receivers. Each has a plurality of input ports 30. A transducer at each input port converts the received electrical signal into sonic vibration in the delay line. Output ports 32 at the other end of the delay line carry electrical signals generated by output transducers that convert the sound signals at the other end back into electrical signals.

The delay lines are dispersive; that is, the delay is dependent on frequency. Furthermore, the delay bears a linear relationship to frequency throughout an operational bandwidth. In two-dimensional compressive receivers, as opposed to the three-dimensional device of the present invention, the sweep rate of the chirped local oscillator is such that delay-line signals caused at the end of a sweep by a given frequency component in the frequency-transistor input arrives at the output end of the delay line at the same time as delay-line signals caused by the same frequency component earlier in the sweep. That is, each input frequency component is time compressed. The sweep rate of the chirped local oscillator 19 of the present invention is only half that of the usual two-dimensional compressive receiver, however, so two series-connected delay lines are necessary to complete the compression.

Each input port 30 of the first group 20 of two-dimensional delay lines is associated with a single frequency translator 16 and thus with a single element 14 of the antenna array 12. The input ports 30 are organized in rows and columns. Each two-dimensional delay line of the first group 20 is associated with a column of antenna elements 14 in the array 12, and each group of ports at corresponding positions on the first-group delay lines are associated with a row of antenna elements 14 in the array 12. For example, the input ports 30 of two-dimensional delay line 22 receive signals that originate in the first column of the antenna array 12, and the group of input ports consisting of the top ports of delay lines 22, 24, 26, and 28 receives signals originating in the top row in the antenna array 12.

The delay-line signals caused by a single single-frequency source constructively interfere at the opposite edges of those delay lines at points determined by the spatial-frequency components in the delay-line inputs. Spatial frequency is the rate at which input-signal phase at a given instant changes with position along the input edge, just as temporal frequency is the rate at which phase changes with time at a given position.

The signals at the output ports 32 of the first group 20 of two-dimensional delay lines are fed to input ports 34 of a second group 36 of similar two-dimensional delay lines 38, 40, 42, and 44. The input ports 34 of the second group are arranged in rows and columns corresponding to the rows and columns of the output ports 32 of the first group 20. The difference between the first and second groups 20 and 36 is that each delay line of the second group 36 corresponds to a row rather than to a column, and the position along the input end of a second-group delay line represents a column, not a row. The signal from a first-group output port 32 in a given row and column is applied to the second-group input port 34 in the corresponding row and column. The resulting signals at the output ports 46 constitute a three-dimensional Fourier transformation of the incoming signals, thereby indicating the frequency components in the incoming signals and the directions of the sources of those frequency components. The operation that gives rise to this transformation will now be described.

It will be recalled that the rate of frequency sweep in the frequency translators of a two-dimensional compressive receiver is such that all of the delay-line signals caused by components of a single frequency in the mixer inputs, regardless of when during a single frequency sweep they occurred, arrive at the output edge of the delay line at substantially the same time. And, arriving at the same time, they constructively interfere at a point on the output edge determined by their spatial frequency. The result is a pulse whose maximum position and time of occurrence indicate spatial and temporal frequency.

Unlike corresponding signals in a two-dimensional compressive receiver, however, the delay-line signals in one of the first-group delay lines 22, 24, 26, and 28 caused by a single single-frequency source are not completely compressed in time when they reach the output ends of the delay lines 22, 24, 26, and 28. This is because the sweep rate of the chirp oscillator 19 has been set to correspond to the frequency-delay relationship of two delay lines in series, not to that of a single delay line. Therefore, later-arriving mixer-input signals from a single single-frequency source cause delay-line signals that arrive later at output ports 32 than delay-line signals caused earlier in the same sweep by signals from the same source. Constructive interference still occurs to cause a maximum at a point that indicates spatial frequency, but the signal maximum is not time compressed.

Specifically, if the column in the antenna array is vertical and the direction of the source forms an elevation angle A with the horizontal, then, for a source that is a large distance from the array, the difference between the distances from the source to adjacent antenna elements 14 in the same column is equal to d sin A, where d is the distance between adjacent elements. Accordingly, the time difference between the arrival of corresponding parts of a signal is equal to $(1/c)(d \sin A)$, where c is the speed of light. The phase difference between adjacent column elements for a given frequency component is thus equal to $(w/c)(d \sin A)$, where w is the temporal frequency of the particular frequency component, so the spatial frequency is $(w/c)(\sin A)$. If the spatial and temporal frequencies are known, the elevation angle of the source is readily determined:

$$A = \arcsin c w_s / w,$$

where $w_s$ is the spatial frequency.

The phase relationships of the signals are conserved during the frequency-translation operation, even though the local-oscillator frequency changes continuously. So the spatial frequency at the input edge of the two-dimensional delay line is equal to that at the antenna elements, multiplied by the ratio of the antenna-element spacing to the delay-line input-port spacing. The geometry of each two-dimensional delay line of this first group 20 is such that delay-line signals caused by a single temporal-frequency component from a single source interfere constructively—and thus form a signal maximum—at a position on the delay-line output edge that is determined only by the spatial frequency of that temporal-frequency component. Thus, the first-group delay lines perform Fourier transformations from vertical position to vertical spatial frequency even though the signal maxima are only partially compressed.

The maximum delay-line outputs caused by a particular frequency component from a particular source occur at corresponding points on the output edges of all the delay lines of the first group 20. For example, if a given source gives rise to a maximum at the second output port from the top of delay line 22, it will also cause a maximum at the second output port from the top in each of delay lines 24, 26, and 28. Since these relatively delayed maxima all occur in the same row, they are all fed to input ports of the same two-dimensional delay line of the second group 36. That is, the second-group delay line that receives the maxima is determined by their vertical frequency.

The time of occurrence of each of these maxima differs from that of the others by a time delay determined by the azimuth angle of the source. Like the signals at the input ports of a given delay line of the first group 20, therefore, the signals caused by the same source at the input ports of a given two-dimensional delay line of the second group 36 have relative delays.

But the signals that a given source causes at second-group input ports 34 differ considerably from those that the same source causes at the first-group input ports 30; that is, the second-group inputs 36 are not of the type received by a typical two-dimensional compressive receiver. Specifically, even though a changing frequency translation is occurring, the signals caused at the input ports 30 of the first group 20 by a single single-frequency source are all of the same temporal frequency at any given instant; they have the same temporal frequency at the source, and the amount of frequency translation at a given instant is the same for all the signals.

On the other hand, the signals caused by a single single-frequency source and appearing at the input ports of a second-group delay line at a given instant are in general of different temporal frequencies; at a given instant, the signal reaching a second-group input port 34 from one of the first-group input ports 30 may have traveled farther to reach the second-group input port than did a signal originating at one of the other first-group input ports. It will thus have been translated in frequency by a different amount. So the types of signals that a second-group delay line receives differs considerably from the types of signals received by a first-group delay line or the delay line of a two-dimensional compressive receiver.

Despite these differences, I have found that second-group delay lines arranged as depicted in the drawing perform a transformation from horizontal position to horizontal spatial frequency while simultaneously completing temporal transformation and preserving the vertical transformation performed by the first group 20. That is, the maximum signal caused by a single single-frequency source at the output edge of a given second-group delay line occurs at a position determined by the spatial frequency at the second-group input ports, and it occurs at a point in time determined by the temporal frequency of the signal produced by the source. Furthermore, since the maximum signals from the first group 20 were all provided to the same two-dimensional delay line of the second group 36, the second-group delay line on which the maximum occurs indicates the vertical spatial frequency.

There is thus a three-dimensional transformation from time, vertical position, and horizontal position to temporal frequency, vertical spatial frequency, and horizontal spatial frequency. With the temporal frequency known, moreover, elevation and azimuth are readily determined from the vertical and horizontal spatial frequencies.

Within the range of frequencies at which they operate, the frequency translators 16 are linear devices. So are the other elements of the illustrated transform device 10. Therefore, although the foregoing discussion describes the operation of the present invention in response to a single single-frequency source, the device 10 can handle a multiplicity of signals at various frequencies from various sources simultaneously. Furthermore, unlike two two-dimensional compressive receivers operating on signals from orthogonal linear arrays, the device of the present invention, when used with a two-dimensional antenna array, can unambiguously identify the directions of multiple sources radiating at the same frequency. Accordingly, it is a powerful tool for detecting and monitoring many signal sources simultaneously.

I claim:

1. A three-dimensional Fourier-transform device comprising:

A. a plurality of first two-dimensional delay lines and a plurality of second two-dimensional delay lines, each first delay line having a plurality of first input ports at an input end thereof and a plurality of first output ports at an output end thereof, each second delay line having a plurality of second input ports at an input end thereof and a plurality of second output ports at an output end thereof, each delay line being configured for constructive interference at positions on the output end thereof corresponding to spatial-frequency components in groups of input signals applied to its input ports, the first output ports being organized in rows and columns, the second input ports being organized in corresponding rows and columns, all output ports on the same first delay line being in the same column and all first output ports on the same positions on different first delay lines being in the same row, all second input ports on the same second delay line being in the same row, and all second input ports in the same positions on different second delay lines being in the same column, each first output port being connected to apply signals thereon to the second input port of the corresponding row and column, a signal path thereby being provided between each first input port and each second output port, the delay lines having a linear relationship between temporal frequency and the time required for a signal of that temporal frequency to propagate from a first input port to a second output port; and B. a frequency translator associated with each first input port, each frequency translator having an input port and having an output port connected to apply signals thereon to its associated first delay-line input port, the frequency translator translating in frequency signals at its input ports by an amount that sweeps repetitively at a rate corresponding to the linear delay-line relationship between delay and frequency so that all signals of a given frequency arriving at the input port of the frequency translator within a given sweep result in signals that arrive at one or more second delay-line output ports substantially simultaneously, the signals at the second output ports thereby constituting a three-dimensional Fourier transformation of the signals at the input ports of the frequency translators.

2. A Fourier-transform device as recited in claim 1 wherein each delay line individually has a linear relationship between temporal frequency and the time required for a signal of that temporal frequency to propagate from its input port to its output port.

3. A two-spatial-dimensional Fourier-transform device comprising a plurality of first two-dimensional delay lines and a plurality of second two-dimensional delay lines, each first delay line having a plurality of first input ports at an input end thereof and a plurality of first output ports at an output end thereof, each second delay line having a plurality of second input ports at an input end thereof and a plurality of second output ports at an' output end thereof, the first output ports being organized in rows and columns, the second input ports being organized in corresponding rows and columns, all output ports on the same first delay line being in the same column and all first output ports on the same positions on different first delay lines being in the same row, all second input ports on the same second delay line being in the same row, and all second input ports in the same positions on different second delay lines being in the same column, each first output port being connected to apply signals thereon to the second input port of the corresponding row and column, a signal path thereby being provided between each first input port and each second output port, each delay line being configured for constructive interference at positions on the output end thereof corresponding to spatial-frequency components in groups of input signals applied to its input ports, the signals at the second output ports thereby constituting a Fourier transformation in two spatial dimensions of the signals at the input ports of the first delay lines.

* * * * *